UNITED STATES PATENT OFFICE.

HEINRICH DRESLER, OF CREUZTHAL, GERMANY, ASSIGNOR TO CÖLN-MÜSENER BERGWERKS ACTIEN-VEREIN, OF CREUZTHAL, GERMANY.

METHOD OF MAKING MOLDED ARTICLES.

No. 876,783.

Specification of Letters Patent.

Patented Jan. 14, 1908.

Application filed December 8, 1906. Serial No. 346,973.

*To all whom it may concern:*

Be it known that I, HEINRICH DRESLER, director of the Cöln Müsener Bergwerks Actien-Verein, of Creuzthal, Westphalia, Germany, a subject of the German Emperor, residing at Creuzthal, Westphalia, Germany, have invented certain new and useful Improvements in Methods of Making Molded Articles; and I do hereby declare the following to be a full, clear, and exact description of the invention, such as will enable others skilled in the art to which it appertains to make and use the same.

My invention relates to a method of making molded articles, without the addition of lime. In carrying out my invention I take slag, grind it, mix it with water, mold the mass thus obtained, place the molded articles in a chamber, establish a vacuum in said chamber and then introduce carbonic acid gas into said chamber.

The invention consists in a vacuum being produced in the hardening chamber, boiler or the like, before or during the action of carbonic acid or of gases containing carbonic acid on the material treated. The object of producing a vacuum is to insure that the carbonic acid should penetrate more quickly and deeply into the interior of the molded articles, whereby on the one hand the process is shortened, and on the other hand thicker molded articles can be hardened right through.

Hitherto the air contained in the molded articles offered resistance to the penetration of carbonic acid, and gave place to the same only in a very gradual manner by diffusion. If, however, a vacuum is produced in the hardening chamber, the air is drawn out from the molded articles, the partially evaporated water of the said articles carrying the air with it. If carbonic acid is then introduced, it will be at once drawn right into the interior of the molded articles, and in that way a stone block or article of any desired shape such as pipes, flagstones, etc., is readily obtained hardened throughout.

A vacuum can be produced in various ways, for instance, by a water jet pump or by a compressor with inverted action, etc. It can, however, be also produced by closing the hardening boiler on both sides after the introduction of the carbonic acid, and allowing a vacuum to be formed by the absorption of carbonic acid. All these methods can be combined in any desired manner. For instance, first air can be driven out from the hardening vessels charged with molded articles, by quickly forcing in carbonic acid, then the vessel is closed, whereupon a vacuum is very quickly produced by absorption of the carbonic acid. The air contained in the article partly escapes at that time and can be drawn out almost entirely by means of an air pump or the like. This process can be repeated several times if desired. The latter is specially advisable where the treatment is effected not by means of pure carbonic acid, but by means of gases containing carbonic acid. After the contents of the gas mixture in carbonic acid have been absorbed, the resulting inoperative gases are pumped out, and after a vacuum has been produced, operative gas mixture is introduced again, and so on, until no more decrease of pressure takes place in the interior of the hardening vessels by absorption of carbonic acid, which is the sign that the process is completed. The pressure in the hardening vessel is preferably read by means of a pressure gage outside the vessel, so that the process can be controlled, and uniform results obtained.

The vacuum production and the introduction of carbonic acid can be regulated automatically, for instance, by means of a mercury column which is forced upwards when vacuum is produced, and at a certain level closes contact in an electric circuit by means of which the air pump is stopped, and at the same time the inlet for carbonic acid, or for operative gases, is opened. After these have reached a certain pressure, another mercury column which is now forced upwards, closes another electric circuit which can shut off the supply of carbonic acid, and so on. The regulation can also be effected mechanically by means of valves arranged on the inlet opening, closing or opening when the pressure changes, or other similar devices.

Having now particularly described and ascertained the nature of the said invention we declare that what we claim is:—

1. The process of making molded articles, which consists in grinding slag, molding the same, placing the molded articles in a chamber, establishing a vacuum in said chamber, and finally introducing carbonic acid into said chamber, substantially as described.

2. The process of making molded articles, which consists in grinding slag without the addition of lime, mixing the ground material with water and molding it, placing the molded articles in a chamber, establishing a vacuum in said chamber, and allowing carbonic acid gas to flow into said chamber, substantially as described.

In testimony whereof, I affix my signature, in presence of two witnesses.

HEINRICH DRESLER.

Witnesses:
 BESSIE F. DUNLAP,
 LOUIS VANDORN.